UNITED STATES PATENT OFFICE.

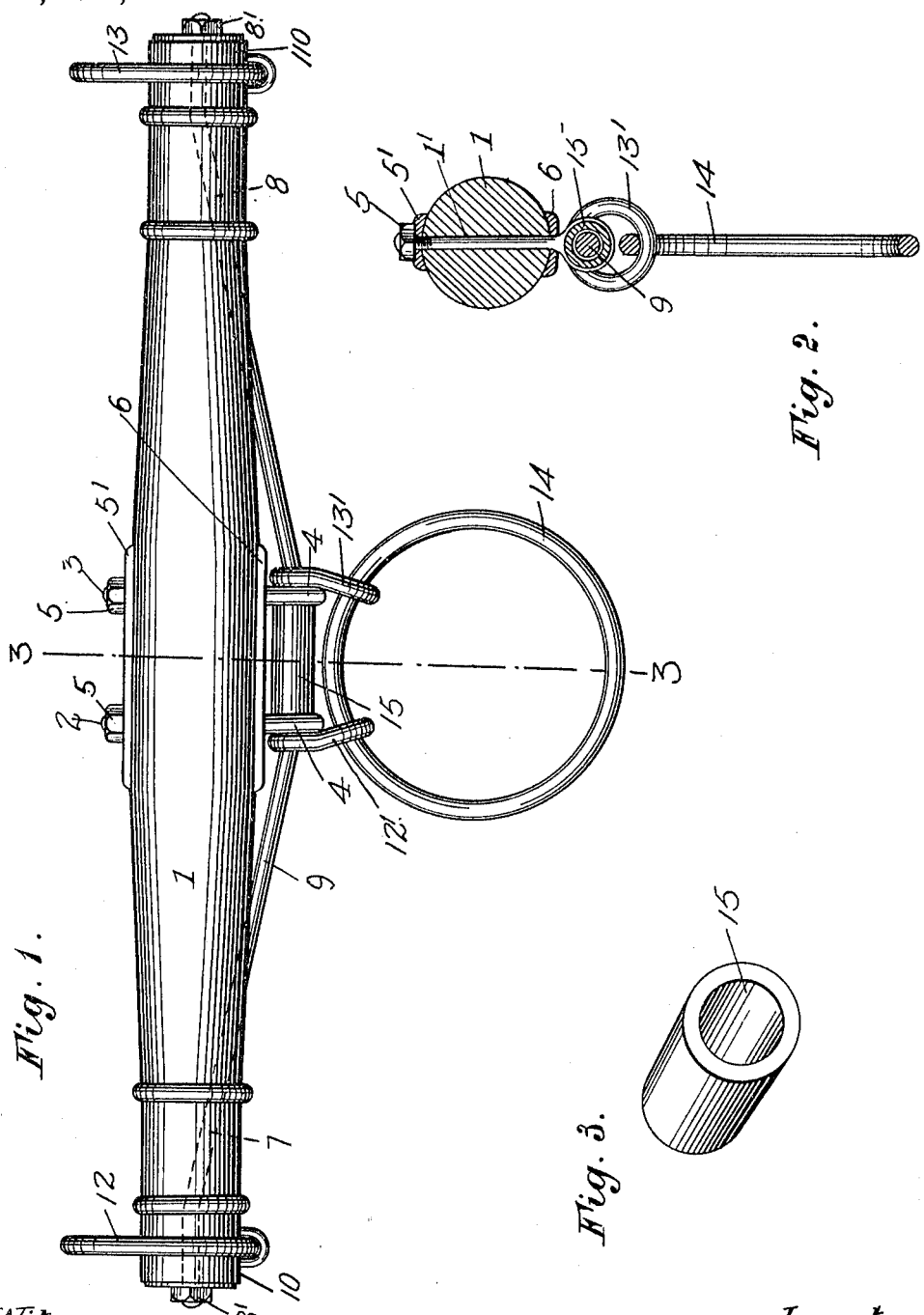

ORRIN TOWNER, OF CRESTON, BRITISH COLUMBIA, CANADA.

NECK-YOKE.

1,073,943.   Specification of Letters Patent.   Patented Sept. 23, 1913.

Application filed November 21, 1912. Serial No. 732,686.

*To all whom it may concern:*

Be it known that I, ORRIN TOWNER, of Creston, in the county of Kootenay, in the Province of British Columbia, Canada, have invented certain new and useful Improvements in Neck-Yokes, of which the following is the specification.

My invention relates to neck-yokes and the like, and more particularly to that type of neck-yokes used with horses.

The principal objects of my invention are first, to provide a simple, inexpensive and effective neck-yoke and the like which is strong and durable and comparatively light in weight.

Another object of my invention is to provide a neck-yoke that is thoroughly braced, so that the strain brought to bear thereon is equally distributed throughout its length.

A still further object of my invention is to construct a neck-yoke so that the several parts can be easily and quickly replaced when broken or worn beyond use.

These improvements, together with such other objects as may hereinafter appear are attained by a neck-yoke that will be presently described and reference will now be had to the drawing forming part of this specification wherein there is illustrated a preferred embodiment of the invention, but it is to be understood that the structural elements thereof can be varied or changed without departing from the spirit of the invention.

In the drawings, Figure 1 illustrates a perspective view of the elements of my invention in an assembled position. Fig. 2, illustrates a vertical sectional view on the line 3—3 of Fig. 1, and Fig. 3 illustrates a perspective view of the tubular member forming part of the neck-yoke.

In the accompanying drawings, 1 designates a bar or body portion made of suitable material preferably wood, but it will be understood that the said bar can be made of metal with equally as good results. Extending through the bar 1 substantially centrally thereof and arranged in spaced relations are bolts 2 and 3, one end of each of said bolts being bent to form an eye 4 and the opposite ends thereof are screw threaded to receive the nuts 5. The guard members 5' and 6 arranged on opposite sides of the bar, are held in position by the said bolts 2 and 3 and nuts 5, and are designed to prevent the nuts 5 or eyes 4 from entering the bar 1 and thereby weakening or disfiguring the same. Extending into the bar 1 near each end thereof are arranged the substantially longitudinally extending bores 7 and 8 respectively, the said bores terminating at the respective ends of the bar.

The ends of the rod 9 which extend through the bores 7 and 8 are screw-threaded to receive nuts 8' for holding the collars 10 and 11 carrying the rings 12 and 13 on the respective ends of the rod, while at the same time when the said nuts are screwed home, the central portion of the rod 9 which extends through the eyes 4 of the bolts, seats the bolts in opening 1' in the bar 1 and holds the several elements forming my invention in an assembled position.

The link members 12' and 13' which support the ring 14 are carried by the substantially central portion of the rod 9. When in operation it will be seen that while the strain on the said yoke is distributed throughout its length, the direct torque would be brought to bear on the eyes 4 of the bolts, and the tendency would be to draw the eyes together. In order to overcome the just mentioned defect, I provide a tubular member or thimble 15 which surrounds the central portion of the rod 9 between the bolts 2 and 3 and holds said bolts in spaced relation at all times. It will be noted that while in operation great strain is brought to bear on the links 12' and 13' which support the pole embracing ring 14, and in order to equally distribute the strain exerted thereon, the links are bent intermediate their length, thus giving a better purchase to the said ring 14.

Although I have described my invention as connected with neck yokes, it will of course be understood that doubletrees may be constructed in a similar way so that the strain brought to bear thereon is equally distributed throughout the length.

What I claim as my invention is.

1. A neck yoke comprising a bar, a rod secured at either end to said bar, bolts carried by said bar, said bolts having eyes at their lower ends encircling said rod, means carried by said rod for spacing said lower ends, and means carried by said rod for connecting said yoke to a wagon tongue.

2. A neck yoke comprising a bar, bolts carried by said bar at each side of its longitudinal center, said bolts being looped at their lower ends, a brace rod passing through the loops of said bolts and having its ends secured to said bar, means encircling said rod for spacing said bolts, links carried by said rod to either side of said spacing means, and a ring carried by said links for supporting a pole.

3. A yoke comprising a bar having bores, bolts extending through the central portion of said bar, each of said bolts having an eye and a screw threaded portion, guard members supported by said bolts, a bracing rod having its ends extending through the respective bores and the central portion thereof extending through the eyes of the bolts, ring supporting members on the respective ends of said bar, links supporting a relatively large ring, associated with said rod, and means for holding the bolts in spaced relation, as and for the purpose specified.

4. A yoke comprising a bar having bores, bolts extending through the bar, one end of each of said bolts being bent to form an eye, a rod having its ends extending through the respective bores, and the central portion of said rod being supported by the said bolts, and a tubular member for holding the eyes of the said bolts in spaced relation, as and for the purpose specified.

5. A neck yoke comprising a bar, a rod secured at either end to said bar, bolts carried by said bar to either side of its longitudinal center, said bolts having looped lower ends encircling said bar, a thimble carried by said bar for spacing said bolts, links carried by said bar to either side of said thimble, said links having inwardly bent lower portions, and a pole supporting ring carried by said links.

ORRIN TOWNER.

Witnesses:
G. A. M. YOUNG,
GEO. M. GUNN.

---

Copies of this patent may be obtained for five cents each, by addressing the "Commissioner of Patents, Washington, D. C."